United States Patent
Slesak et al.

(10) Patent No.: US 7,182,461 B2
(45) Date of Patent: Feb. 27, 2007

(54) INTEGRATED DOCKING ASSEMBLY FOR PORTABLE MULTIMEDIA UNIT

(75) Inventors: Christian H. Slesak, Dearborn Heights, MI (US); Saqib Masood, Canton, MI (US); Christopher E. Andrews, Southlyon, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 263 days.

(21) Appl. No.: 10/892,421

(22) Filed: Jul. 15, 2004

(65) Prior Publication Data

US 2005/0054231 A1 Mar. 10, 2005

Related U.S. Application Data

(60) Provisional application No. 60/487,462, filed on Jul. 15, 2003.

(51) Int. Cl.
*G03B 21/14* (2006.01)

(52) U.S. Cl. .................... 353/13; 248/27.1; 248/205.1; 439/297

(58) Field of Classification Search ................ 353/12, 353/13, 14, 122; 248/27.1, 27.3, 205.1; 439/297, 439/298
See application file for complete search history.

(56) References Cited

U.S. PATENT DOCUMENTS

| 5,833,815 A | * | 11/1998 | Kim et al. | .............. 204/192.12 |
| 6,318,679 B1 | * | 11/2001 | Yang et al. | ................ 248/27.1 |
| 6,443,574 B1 | | 9/2002 | Howell et al. | |
| 6,939,155 B2 | * | 9/2005 | Postrel | ....................... 439/297 |

* cited by examiner

*Primary Examiner*—William C. Dowling
(74) *Attorney, Agent, or Firm*—Brinks Hofer Gilson & Lione

(57) ABSTRACT

The present invention involves an integrated docking assembly for a portable multimedia unit in a vehicle. The assembly comprises a receiver frame configured to receive the portable multimedia unit and a locking mechanism configured to secure the portable multimedia unit in the receiver frame. The locking mechanism includes spring loaded locking tabs and a push member connected to the locking tabs for securing and releasing the portable multimedia unit.

14 Claims, 3 Drawing Sheets

INTEGRATED DOCKING ASSEMBLY FOR PORTABLE MULTIMEDIA UNIT

CROSS-REFERENCE TO RELATED APPLICATIONS

This application claims priority to U.S. Provisional Application No. 60/487,462 filed Jul. 15, 2003, entitled "Integrated Portable DVD Docking Station."

BACKGROUND OF THE INVENTION

The present invention relates to an integrated docking assembly for a portable multimedia unit in a vehicle.

Currently, there a number of in-vehicle family entertainment or multimedia systems available either from an automotive original equipment manufacturer (OEM) or an aftermarket provider. Most entertainment systems provide media specific entertainment that can be integrated into a vehicle. However, current systems do not allow for easy portability of the system or flexibility of using different media entertainment systems. Typically, if an upgrade is desired, then the entire system is replaced.

For example, transferable or portable vehicle entertainment systems are relatively large in size. Such systems require several hours for an end user to install the system onto the console or overhead of the vehicle entertainment system. Moreover, aftermarket systems currently require straps that wrap around the front seats of the vehicle for screen stability during movement of the vehicle. Such systems require the end user to manually connect wires to the vehicle console, such as power, audio, and head phones. Such requirements increase the installation time of the entertainment system and reduce end user satisfaction.

Other current systems, such as portable media players, may also be improved. For example, one drawback of portable media players is that such systems have non-secure mounting wherein an occupant is required to hold the unit during its use. Additionally, portable media players lack the capability to connect to the vehicle speakers for surround sound and lack the ability to connect wireless headphones thereto.

Fully integrated entertainment systems have addressed such issues, but also have their disadvantages. For example, fully integrated systems are not portable and, thus, cannot be used in other locations other than the vehicle. With the growth of portable electronic devices, there is a trend in reducing the number of systems that are redundant.

Thus, there is a need to provide a portable, compact, and interchangeable multimedia unit with connection ease for the end user.

BRIEF SUMMARY OF THE INVENTION

The present invention generally provides an integrated docking assembly for a portable multimedia unit in a vehicle. The integrated docking assembly provides for easy portability of the multimedia unit and allows for flexibility of using different media entertainment units while requiring minimal time for connection and disengagement. The present invention also provides a docking assembly that secures and integrates the portable multimedia unit to avoid non-mounting issues. Moreover, the integrated docking assembly allows for quick electrical connections and wireless capabilities.

In one embodiment, the integrated docking assembly comprises a receiver frame configured to receive the portable multimedia unit and a locking mechanism configured to secure the portable multimedia unit in the receiver frame. The locking mechanism includes spring loaded locking tabs and a push member connected to the locking tabs for securing and releasing the portable multimedia unit from the receiver frame.

In another embodiment, the integrated docking assembly includes a general locking mechanism configured to secure the portable multimedia unit in the receiver frame, an electrical connector for electrical connection with the portable multimedia unit, and a spring loaded and/or magnet forced retractable cover plate for covering the receiver frame when the portable multimedia unit is disconnected from the receiver frame. In this embodiment, the electrical connector is attached to the receiver frame and is configured to receive electrical components of the portable multimedia unit. Moreover, the spring loaded retractable cover plate is configured to cooperate with the receiver frame to biasingly retract from the frame when the portable multimedia unit is received in the receiver frame.

In yet another embodiment, the receiver frame has a base and a plurality of side walls wherein each side wall has first and second sides. Each of the first sides is attached to the base defining a docking area. The second sides define a receiving area for receiving the portable multimedia unit in the docking area. Moreover, the spring loaded retractable cover plate is configured to cooperate with the receiver frame to biasingly retract from the frame toward the base when the portable multimedia unit is received in the receiver frame.

Further objects, features and advantages of the invention will become apparent from consideration of the following description and the appended claims when taken in connection with the accompanying drawings.

DETAILED DESCRIPTION OF THE INVENTION

Figure 1:
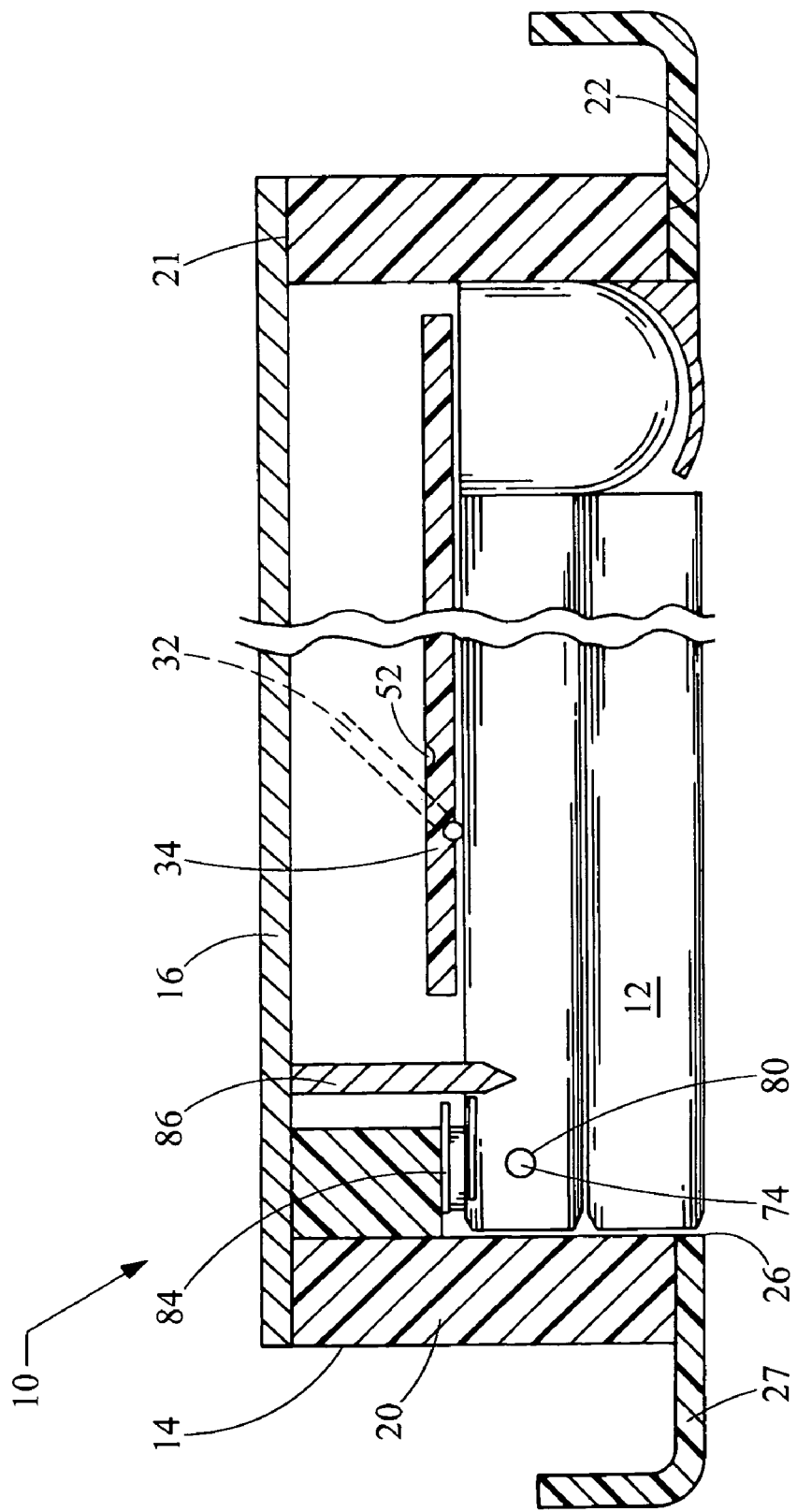
FIG. 1 is a cross-sectional view of an integrated docking assembly for a portable multimedia unit in accordance with one embodiment of the present invention.

FIG. 1 illustrates an integrated docking assembly 10 for a portable multimedia unit 12 for use in a vehicle in accordance with one embodiment of the present invention. As shown, the docking assembly 10 includes a receiver frame 14 configured to receive the portable multimedia unit 12 in a vehicle. The receiver frame 14 has a base 16 and a plurality of side walls 20. Each side wall 20 has first and second sides 21, 22 wherein each of the first sides 21 is attached to the base 16 defining a docking area 23 for the multimedia unit 12. Each of the side walls 20 extend from the first side 21 to the second side 22 defining a receiving area 26 for receiving the portable multimedia unit 12 in the docking area 23. Preferably, the receiver frame 14 is disposed and integrated within the headliner 27 of the vehicle.

Figure 2:
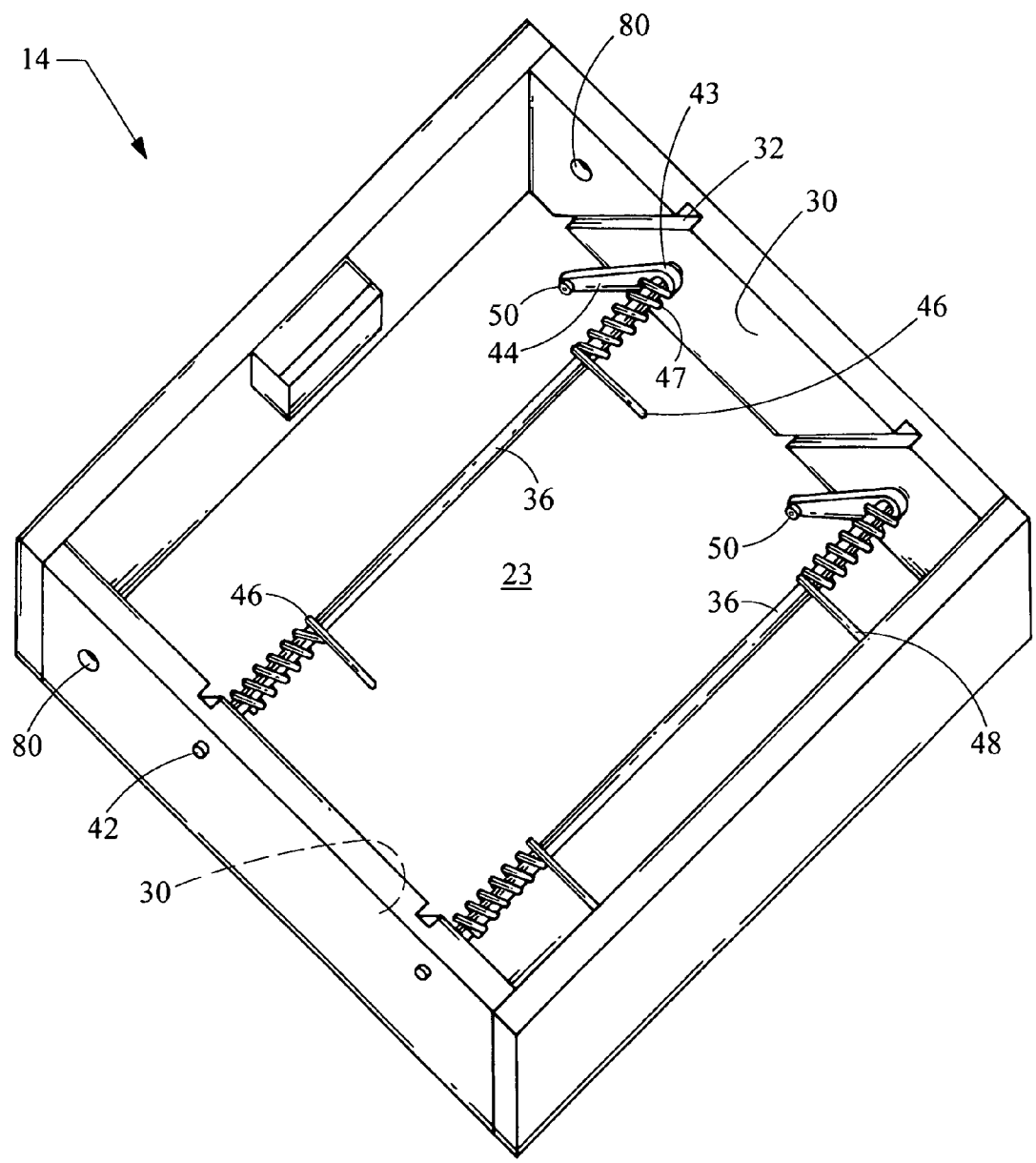
FIG. 2 is a perspective view of a receiver frame of the docking assembly in FIG. 1.

As shown in FIGS. 1 and 2, each of the side walls 20 of the receiver frame 14 includes an inner side 30. In this embodiment, two opposing side walls 20 include sliding tracks 32 formed thereon. As discussed in greater detail below, a spring loaded retractable cover plate 34 cooperates with the receiver frame 14 via the sliding tracks 32 to cover the docking area 23 when the portable multimedia unit 12 is not docked in the receiver frame 14. The receiver frame 14 includes at least one shaft 36 attached across the opposing side walls 20 of the receiver frame 14. In this embodiment, two shafts 36 are attached across the opposing side walls 20. As shown, each shaft 36 includes first and second ends 42, 43 and has spring loaded cam lobes 44, each of which is attached adjacent to one of the first and second ends 42, 43. Each of the ends 42, 43 has a torsion spring 46 having first and second spring ends 47, 48 and are disposed about the shaft 36. In this embodiment, the first spring end 47 is affixed to the cam lobe 44 and the second spring end 48 may be engaged on the receiver frame 14 for torsion. In turn, the cam lobes 44 are biased away from the base 16 to bias the cover plate 34 away from the base 16, defining a normal position.

In this embodiment, cover plate 34 cooperates with the receiver frame 14 and the cam lobes 44 to biasingly slide along the sliding tracks 32 when the portable multimedia unit 12 is connected and disengaged from the integrated docking assembly 10. The cover plate 34 is slidably attached to the sliding tracks 32 by any suitable means. As shown, the cover plate 34 includes a show surface 37 and a back surface 38. The back surface 38 of the cover plate 34 includes a groove or roll track 52 formed thereon. Preferably, a roller 50 is affixed to the end of each cam lobe 44, allowing the cam lobes 44 to engage and roll smoothly along the groove 52 of the back surface 38 when the cover plate 34 moves along the sliding tracks 32. The groove 52 serves to maintain uniform motion of the cam lobes 44, prevent side to side movement of the cover plate 34, and allow easy insertion of the multimedia unit 12. Other spring loaded mechanisms may also be used to further decrease the profile of the docking assembly 10. Each groove 52 may also be formed to match the insertion path and cam roll of the cam lobe 44.

Figure 3:
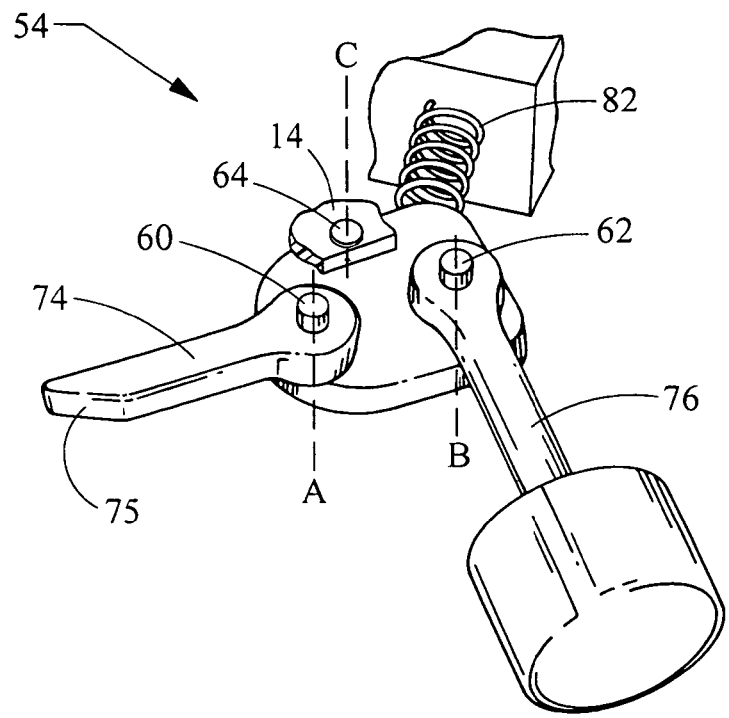
FIG. 3 is a perspective view of a locking mechanism of the docking assembly.

FIG. 3 illustrates the integrated docking assembly 10 further including a spring-loaded locking mechanism 54 configured to secure the portable multimedia unit 12 in the receiver frame 14. As shown, each locking mechanism 54 includes a pivot plate 56 for securing and releasing the portable multimedia unit 12. In this embodiment, two pivot plates 56 are incorporated. Each pivot plate 56 includes a first pivot joint 60, a second pivot joint 62, and a third pivot joint 64, defining a first pivot axis A, a second pivot axis B, and third pivot axis C, respectively. As shown, a locking tab 74 is connected to the first pivot joint 60 and a push member 76 is connected to the second pivot joint 62. Moreover, the third pivot joint 64 is configured to be attached to the receiver frame 14. As shown, a loading spring 82 is disposed on the pivot plate 56 and engages the receiver frame 14 to spring load the locking mechanism 54 away from the base 16.

Figure 4:
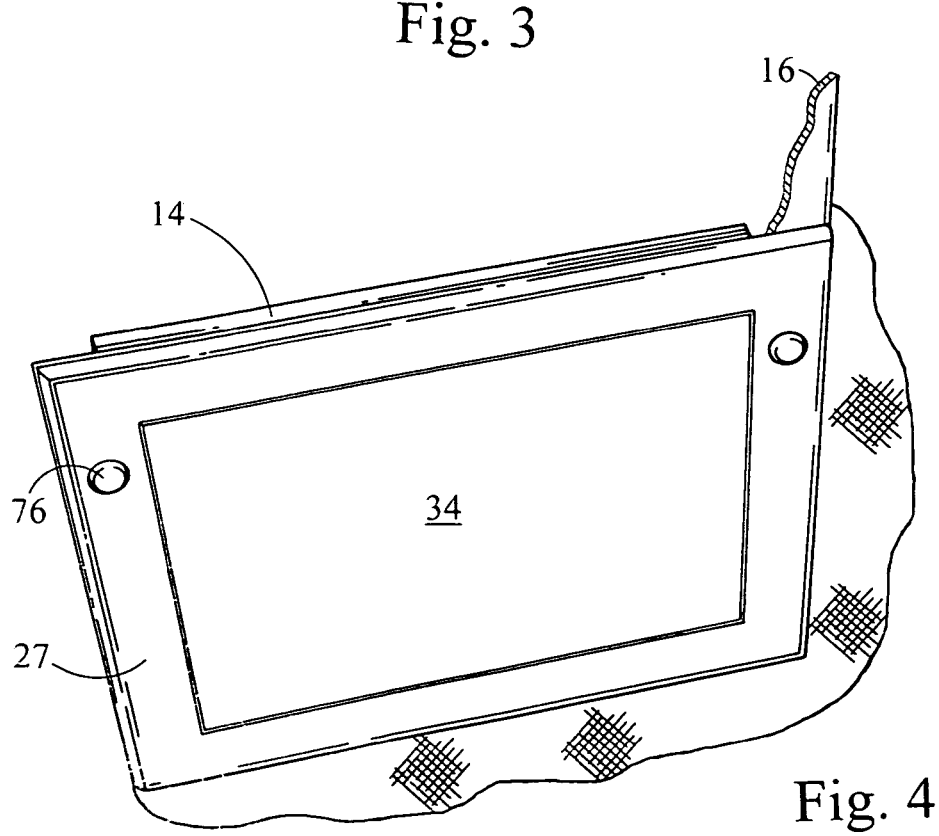
FIG. 4 is a perspective view of the docking assembly assembly in FIG. 1.

In this embodiment, each locking tab 74 is disposed through a receptacle 80 of the receiver frame 14 to secure the multimedia unit 12 when inserted in the receiver frame 14. The pivot joints 60, 62, 64 allow the pivot plate 56 to pivot relative to the receiver frame 14 when the push member 76 is pushed toward the base 16 of the receiver frame 14. The locking tab 74, push member 76, and spring cooperate together such that when the push member 76 is pushed toward the base 16, the pivot plate 56 biasingly pivots about the first, second, and third pivot axes A, B, C. Such movement of the pivot plate 56, in turn, causes movement of the locking tabs 74 away from each other. As shown in FIGS. 2–4, the end faces of the locking mechanisms 54 are located adjacent the second sides 22 of the receiver frame 14.

FIG. 3 further depicts the locking tabs 74 having tapered portions 75 for receiving the multimedia unit 12. Upon insertion of the multimedia unit 12, the push members 76 are depressed toward the base 16 of the receiver frame 14 and the locking tabs 74 move away from the flange allowing the multimedia unit 12 to be inserted into the receiver frame 14. When the flange of the multimedia unit 12 clears the locking tabs 74, the locking tabs 74 biasingly move back to their spring biased position to secure the multimedia unit 12 within the docking area 23. Upon removal of the unit 12, the push members 76 are depressed, allowing the unit 12 to disengage and release from the docking assembly 10.

Preferably, installing the portable multimedia unit 12 within the receiving frame 14 involves holding the front side of the portable multimedia unit 12 and inserting the unit into the docking assembly 10 back side first. Removing the multimedia unit 12 from the docking assembly 10 preferably includes pushing on both of the push members 76 and receiving the portable multimedia unit 12 as its front end is released from the docking assembly 10.

It is to be noted that other locking mechanisms 54 may be used to connect a portable multimedia unit 12 to the integrated docking assembly 10. Such locking mechanisms 54 may include but are not limited to (1) fasteners, e.g., screw in fasteners, by which the multimedia unit 12 is fastened to the docking assembly 10, (2) plug or suction method by which the multimedia unit 12 is plugged to the receiver frame 14, (3) Velcro™ or a strap by which Velcro™ or straps are incorporated therein to integrate a multimedia unit 12 to the integrated docking assembly 10, (4) a ball and socket joint by which the unit connects or snaps to the integrated docking assembly 10. Other connecting assemblies may be used without falling beyond the scope or spirit of the present invention.

A secondary or safety lock may be used to provide extra security and protection. The secondary lock may clamp the unit to the docking assembly 10, ensuring the safety of the passengers. The safety lock may also serve as the power switch for any module locked into the docking assembly 10, not allowing any electrical connections to close without the safety lock in place.

FIG. 1 further illustrates that the integrated docking assembly 10 also includes an integrated electrical connector 84 for electrical connection with the portable multimedia unit 12. As shown, the multimedia unit 12 has electrical contacts in alignment with the electrical connector 84 of the integrated docking assembly 10. In this embodiment, the electrical connector 84 is attached to the receiver frame 14 and is configured to receive electrical components of the portable multimedia unit 12 for relatively quick and simple electrical connection between the multimedia unit 12 and the electronic components of the vehicle. For accurate alignment purposes, a locator pin 86 may extend from the base 16 of the receiver frame 14 to engage with a mating notch 90 formed on the multimedia unit 12. Other ways of assuring correct connection may also be used without falling beyond the scope or spirit of the present invention.

In use, the electrical connector 84 functions to create an interface that allows the user to install the portable multimedia unit 12, or other module, into the docking assembly 10 without requiring extra steps of manually connecting any wires. The electrical connector 84 may pass audio and video signals, power, and any other signals that may be needed. The power to the docking assembly 10 may also power units that serve as a light source for the vehicle cabin. Preferably, the electrical connectors 84 are small electrical flat circuit connectors which make contact through a contact pad on a mating side thereof. Other electrical connectors may be used to provide electrical connections and provide a hands free mating connection, including gold plate connections for low current signals.

FIG. 4 illustrates the integrated docking assembly 10 when not in use and free from a multimedia unit 12 disposed therein. As shown, the cover plate 34 covers the docking area 23, providing an aesthetic show surface of the headliner 27 of the vehicle. As mentioned above, the cover plate 34 is designed to retract when a module is inserted and biasingly returns when the multimedia unit 12 is not docked. The cover plate 34 hides any otherwise exposed mechanisms and allows the docking assembly 10 to look aesthetically pleasing even when there are no modules docked in the station. For security purposes the hideaway cover also acts as a camouflage, matching the texture and color of the portable multimedia unit 12. To an outside person looking in, they would not be able to decipher whether or not the Multimedia unit 12 is connected or disengaged to the assembly 10, reducing the likelihood of theft.

As a multimedia unit 12 is inserted in the docking assembly 10 for docking, the cover plate 34 slidably moves toward the base 16 of the receiver frame 14, allowing the multimedia unit 12 docking space therein. As mentioned above, the locking tabs 74 move away from each other through apertures 80, allowing a flange of the multimedia unit 12 to clear. As the multimedia unit 12 flange clears the locking tabs 74, pressure is released from the end faces of the push members and the locking tabs 74 biasingly move toward each other to engage the flange, securing the multimedia unit 12 in the docking assembly 10.

In one embodiment, the multimedia unit 12 is a DVD unit having a pivoting flat screen as known in the art. In this embodiment, the electrical connectors 84 are used to send and receive signals to and from the DVD unit to automatically invert the image relative to the viewing position of the flat screen and to the user, without any additional user interaction. In this embodiment, upon insertion of the DVD unit, the screen image automatically inverts to the desired or correct orientation.

In this embodiment, the audio signals travel through the electrical interface and are parceled through an audio bus line. The audio may be routed to an IR transmitter to be broadcast to IR wireless headphones. The signals may be converted to an IR signal, and then the IR wireless headphones may decode the signals and convert the signals into actual audio. The audio format may be stereo, 5.1, 7.1 surround sound, but not limited to any other formats. The video output from the DVD unit is transmitted directly to one or more displays in the vehicle. Preferably, the power input to the multimedia unit 12 is a regulated voltage.

As shown, the integrated docking assembly 10 may be a standard center pod integrated with the headliner 27 of the vehicle. The purpose of the standard center pod is to create an infrastructure within the vehicle that gives the system the ability to add other modules. The standard center pod provides the OEM with the ability to make changes with greater time efficiency, upgrade the modules (e.g., from an 8" to 10" inch screen or other size screens), add modules that may contain various technologies (e.g. vehicle gaming, PC based modules or other operating system based modules, modules with smart card technology, DVD-R and DVD-RW or other DVD based modules, light modules, storage modules, hard drive based modules, TV recording based modules and other electronic modules capable of being docked to the standard center pod.

While the present invention has been described in terms of preferred embodiments, it will be understood, of course, that the invention is not limited thereto since modifications may be made to those skilled in the art, particularly in light of the foregoing teachings.

The invention claimed is:

1. An integrated docking assembly for a portable multimedia unit in a vehicle, the assembly comprising:
   a receiver frame configured to receive the portable multimedia unit;
   a locking mechanism configured to secure the portable multimedia unit in the receiver frame, the locking mechanism including spring loaded locking tabs and a push member connected to the locking tabs for securing and releasing the portable multimedia unit; and
   a spring loaded retractable cover plate for covering the docking area when the multimedia unit is disengaged from the integrated docking assembly, the retractable cover plate being configured to cooperate with the receiver frame to biasingly retract from the receiver frame toward the base when the portable multimedia unit is received in the receiver frame.

2. The integrated docking assembly of claim 1 wherein the receiver frame has a base and a plurality of side walls connected thereto, each side wall having first and second sides, each of the first sides being attached to the base defining a docking area, each of the second sides extending from the first side and defining a receiving area for receiving the portable multimedia unit in the docking area.

3. The integrated docking assembly of claim 2 wherein each of the side walls includes an inner side, at least two opposing side walls having sliding tracks formed on the inner side thereof.

4. The integrated docking assembly of claim 3 wherein the receiver frame including at least one shaft attached across the opposing side walls, each shaft including first and second ends, each of the first and second ends having a spring-loaded cam lobe attached adjacent thereto, each of the cam lobes being biased away from the base of the receiver frame.

5. The integrated docking assembly of claim 4 further comprising a spring loaded retractable cover plate for covering the docking area when the multimedia unit is disengaged from the integrated docking assembly, the cover plate being slidably attached to the sliding tracks of the receiver frame and engaging the cam lobes to be biased away from the base.

6. The integrated docking assembly of claim 1 further comprising an electrical connector for electrical connection with the portable multimedia unit, the electrical connector being attached to the receiver frame and configured to receive electrical components of the portable media unit.

7. The integrated docking assembly of claim 6 wherein the electrical connector is a flat circuit connector.

8. An integrated docking assembly for a portable multimedia unit in a vehicle, the assembly comprising:
   a receiver frame configured to receive the portable multimedia unit;
   a locking mechanism configured to secure the portable multimedia unit in the receiver frame;
   an electrical connector for electrical connection with the portable multimedia unit, the electrical connector being attached to the receiver frame and configured to receive electrical components of the portable multimedia unit; and a spring loaded retractable cover plate for covering the receiver frame, the retractable cover plate being configured to cooperate with the receiver frame to biasingly retract from the frame when the portable multimedia unit is received in the receiver frame.

9. The integrated docking assembly of claim 8 wherein the receiver frame has a base and a plurality of side walls connected thereto, each side wall having first and second sides, each of the first sides being attached to the base defining a docking area, each of the second sides extending from the first side and defining a receiving area for receiving the portable multimedia unit in the docking area.

10. The integrated docking assembly of claim 8 wherein the locking assembly includes spring loaded locking tabs and a push member connected to the locking tabs for securing and releasing the portable multimedia unit.

11. The integrated docking assembly of claim 9 wherein each of the side walls includes an inner side, at least two opposing side walls having sliding tracks formed on the inner side thereof.

12. The integrated docking assembly of claim 11 wherein the receiver frame including at least one shaft attached across the opposing side walls, each shaft including first and second ends, each of the first and second ends having a spring-loaded cam lobe attached adjacent thereto, each of the cam lobes being biased away from the base of the receiver frame.

13. The integrated docking assembly of claim 12 further comprising a spring loaded retractable cover plate for covering the docking area when the multimedia unit is disengaged from the integrated docking assembly, the cover plate being slidably attached to the sliding tracks of the receiver frame and engaging the cam lobes to be biased away from the base.

14. An integrated docking assembly for a portable multimedia unit in a vehicle, the assembly comprising:

a receiver frame configured to receive the portable multimedia unit, the frame having a base and a plurality of side walls, each side wall having first and second sides, each of the first sides being attached to the base defining a docking area, the second sides defining a receiving ares for receiving the portable multimedia unit in the docking area;

a locking mechanism configured to secure the portable multimedia unit in the receiver frame, the locking mechanism including spring loaded locking tabs and a push member connected to the locking tabs for securing and releasing the portable multimedia unit;

an electrical connector for electrical connection with the portable multimedia unit, the electrical connector being attached to the receiver frame and configured to receive electrical components of the portable multimedia unit; and a spring loaded retractable cover plate for covering the receiver frame, the retractable cover plate being configured to cooperate with the receiver frame to biasingly retract from the frame toward the base when the portable multimedia unit is received in the receiver frame.

* * * * *